United States Patent
Yan

(10) Patent No.: US 11,585,754 B2
(45) Date of Patent: Feb. 21, 2023

(54) PARTICLE DETECTION DEVICE

(71) Applicant: Taiwan RedEye Biomedical Inc., Hsinchu (TW)

(72) Inventor: Shuo-Ting Yan, Hsinchu (TW)

(73) Assignee: TAIWAN REDEYE BIOMEDICAL INC., Hsinchu (TW)

( * ) Notice: Subject to any disclaimer, the term of this patent is extended or adjusted under 35 U.S.C. 154(b) by 47 days.

(21) Appl. No.: 17/378,270

(22) Filed: Jul. 16, 2021

(65) Prior Publication Data

US 2023/0015811 A1 Jan. 19, 2023

(51) Int. Cl.
*G01N 21/53* (2006.01)
*G01N 15/02* (2006.01)
*G01N 15/14* (2006.01)

(52) U.S. Cl.
CPC ......... *G01N 21/53* (2013.01); *G01N 15/0211* (2013.01); *G01N 15/1434* (2013.01); *G01N 15/1459* (2013.01)

(58) Field of Classification Search
CPC ............... G01N 21/53; G01N 15/0211; G01N 15/1434; G01N 15/1459
See application file for complete search history.

(56) References Cited

U.S. PATENT DOCUMENTS 9,243,994 B1 * 1/2016 Ishizuka ............ G01N 15/1456

FOREIGN PATENT DOCUMENTS

| JP | H0743300 A | * | 2/1995 | ............ G01N 21/53 |
| JP | 2021-4757 A | | 1/2021 | |
| JP | 2021-25930 A | | 2/2021 | |
| TW | 201721130 A | | 6/2017 | |
| TW | 201903382 A | | 1/2019 | |

* cited by examiner

*Primary Examiner* — Rebecca C Bryant
(74) *Attorney, Agent, or Firm* — Birch, Stewart, Kolasch & Birch, LLP

(57) ABSTRACT

A particle detection device includes a detection tube, a light emitter, a light receiver, and a processing unit. The detection tube is for a detection solution to pass through. The light emitter generates a detection light and emits the detection light to the detection solution. The light receiver receives the detection light scattered from the detection solution. The processing unit generates a received light intensity value according to the detection signal generated by the light receiver, and determines whether the received light intensity value is greater than a first threshold value: if greater, generating a detection result of particles; otherwise, generating a detection result of no particles. Then it provides a basis for semiconductor manufacturing companies to evaluate whether the detection solution can be used in a high-precision manufacturing processes, thereby optimizing the manufacturing process and improving the yield rate of the high-precision manufacturing process.

10 Claims, 11 Drawing Sheets

PARTICLE DETECTION DEVICE

BACKGROUND OF THE INVENTION

1. Field of the Invention

The present invention relates to a detection device, and more particularly to a particle detection device.

2. Description of the Prior Arts

In the precision semiconductor manufacturing process, there are many wet and cleaning processes requiring a large amount of solution for operation. In addition to high-purity water, there are many chemical solutions in these solutions, such as HCL, $NH_4OH$, $H_2O_2$, HF, $H_3PO_4$, $H_2SO_4$, etc.

Generally, semiconductor manufacturing companies need to purchase chemical solutions from chemical solution manufacturers, but it is difficult for them to test the chemical solutions. If the chemical solution contains particles, especially charged particles or metal particles, the charged particles or the metal particles are likely to remain in the semiconductor chip after the process. For high-precision manufacturing processes, the smaller the line width is, the easier the circuit is to short-circuit and cause semiconductor chip failure.

For the high-precision manufacturing processes, the process yield can be greatly affected by the charged particles or metal particles in the chemical solution. If the chemical solution cannot be tested, it will seriously affect the evaluation of the process yield.

SUMMARY OF THE INVENTION

In order to solve the above problem, the present invention provides a particle detection device, which can detect whether there are charged particles or metal particles in the chemical solution, thereby reducing the influence of the chemical solution on the process yield.

The particle detection device comprises:
  a detection tube, for passing through a detection solution;
  a light emitter, generating a detection light, and emitting the detection light to the detection solution;
  a light receiver, receiving the detection light scattered from the detection solution, and generating a detection signal according to the detection light;
  a processing unit electrically connected to the light emitter and the light receiver; wherein
  when the processing unit receives an activation signal, the processing unit controls the light emitter to generate the detection light, and emits the detection light to the detection tube;
  when the processing unit receives the detection signal generated by the light receiver, the processing unit generates a received light intensity value according to the detection signal, and determines whether the received light intensity value is greater than a first threshold value:
  when the received light intensity value is greater than the first threshold value, the processing unit generates a detection result that the detection solution contains particles;
  when the received light intensity value is not greater than the first threshold value, the processing unit generates a detection result that the detection solution contains no particles.

When a semiconductor manufacturing company purchases a chemical solution from a chemical solution manufacturer and before the chemical solution is used in the process, the chemical solution can be the detection solution to flow into the detection tube. If there are particles in the detection solution, the detection light entering the detection solution can be scattered by the particles, and the scattered detection light can be received by the light receiver. The more scattered detection light is received (the stronger the received light intensity is), the more particles in the solution to be detected.

The present invention can determine the number of particles in the detection solution by determining whether the received light intensity value is greater than the first threshold value. If the received light intensity value is greater than the first threshold value, it represents that particles exist in the detection solution, which will affect the yield of subsequent high-precision manufacturing processes. Therefore, the detection solution is not recommended to be used in the high-precision manufacturing process to avoid semiconductor chip failure because of short circuit.

The detection result that the detection solution contains particles or not can be a basis for semiconductor manufacturing companies to evaluate whether the chemical solution can be used in the high-precision process, thereby improving the yield of the high-precision process.

DETAILED DESCRIPTION OF THE PREFERRED EMBODIMENTS

Figure 1A:
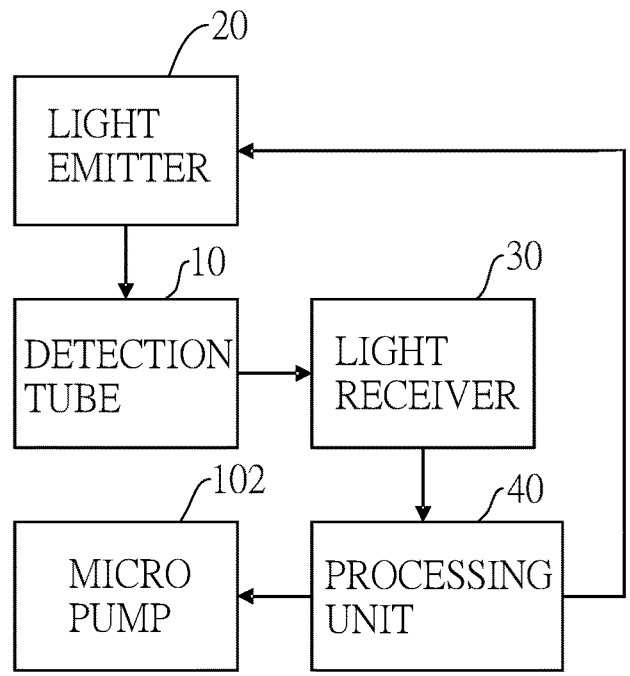
FIG. 1A is a block diagram of the particle detection device of the present invention.
Figure 1B:
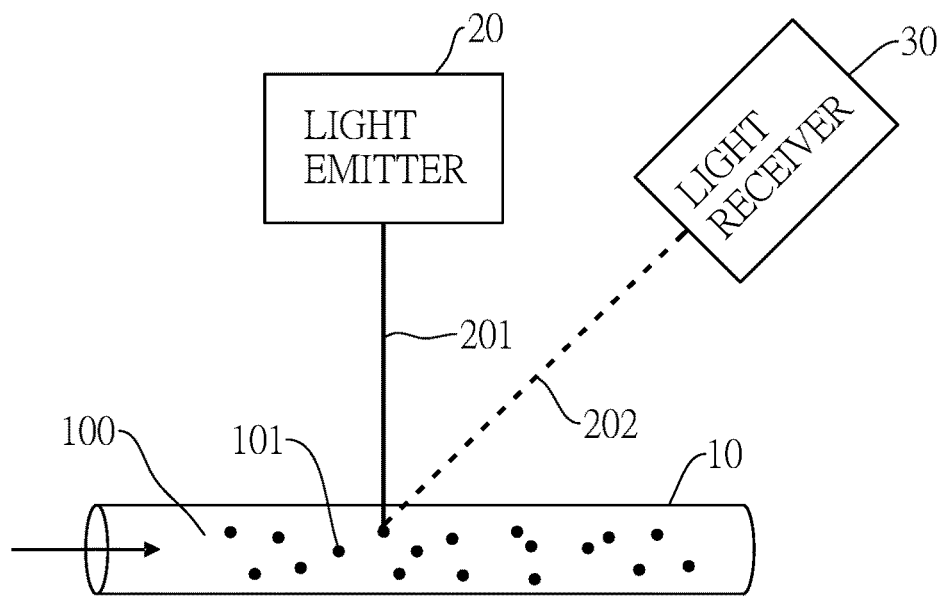
FIG. 1B is a schematic diagram of the particle detection device of the present invention.

Referring to FIG. 1A and FIG. 1B, a particle detection device of the present includes a detection tube 10, a light emitter 20, a light receiver 30 and a processing unit 40. The detection tube 10 is for a detection solution 100 to pass through. The light emitter 20 generates a detection light 201 and emits the detection light 201 to the detection tube 10, and then the detection light 201 goes in the detection solution 100. The light receiver 30 receives the detection light 202 scattered from the detection solution and generates a detection signal according to the scattered detection light 202.

The processing unit 40 is electrically connected to the light emitter 20 and the light receiver 30. When the processing unit 40 receives an activation signal, the processing unit 40 controls the light emitter 20 to generate the detection light 201 and emit the detection light 201 to the detection tube 10. When the processing unit 40 receives the detection signal generated by the light receiver, the processing unit 40 generates a received light intensity value according to the detection signal and determines whether the received light intensity value is greater than a first threshold value.

When the received light intensity value is greater than the first threshold value, the processing unit 40 generates a detection result that the detection solution contains particles; when the received light intensity value is not greater than the first threshold value, the processing unit 40 generates a detection result that the detection solution contains no particles.

Based on the above, when purchasing a chemical solution from a chemical solution manufacturer and before the chemical solution is used in the process, a semiconductor manufacturing company only needs to put the chemical solution into the detection tube 10 of the particle detection device, the chemical solution as the detection solution 100 passes through the detection tube 10, and then the particle detection device can detect whether there are particles 101 in the detection solution 100.

If there are particles 101 in the detection solution 100, the detection light 201 entering the detection solution can be scattered by the particles 101, and the scattered detection light 202 can be received by the light receiver 30. That is, the more the scattered detection light 202 received by the light source receiver 30, the stronger the intensity of the received light source, which represents the greater the number of particles 101 in the detection solution 100. As a result, the detection light 202 is largely scattered by the great number of particles 101 to be received by the light receiver 30.

In the present invention, the number of particles 101 in the detection solution 100 can be confirmed by determining whether the received light intensity value is greater than the first threshold value. If the received light intensity value is greater than the first threshold value, it means there are too many particles 101 in the detection solution 100, which can affect the yield of high-precision manufacturing processes. Therefore, the detection solution 100 is not recommended to be used in the high-precision manufacturing process to avoid semiconductor chip failures caused by short circuits in the chip.

Therefore, the detection result whether the detection solution 100 contains particles or no particles can be a basis for semiconductor manufacturing companies to evaluate whether the chemical solution can be used for high-precision manufacturing processes, thereby optimizing the manufacturing process and improving the yield of high-precision manufacturing processes.

In addition, the particle detection device of the present invention can be directly configured in the production line, or set separately. When the particle detection device is configured in the production line, the chemical solution flows from a containing tank into the production line through the detection tube 10 of the particle detection device. During the process, the chemical solution can be simultaneously detected whether there are particles in the chemical solution to monitor the manufacturing process in real time. If there are particles, the chemical solution will not be added to the production line.

When the particle detection device is set separately, the detection tube 10 of the particle detection device is additionally configured to detect whether there are particles in the chemical solution. When a semiconductor manufacturing company purchases a chemical solution, the chemical solution will be flowed into the detection tube 10 of the particle detection device to detect whether there are particles in the chemical solution. If there are no particles, the chemical solution is flowed into the containing tank, and then added to the production line.

Figure 2A:
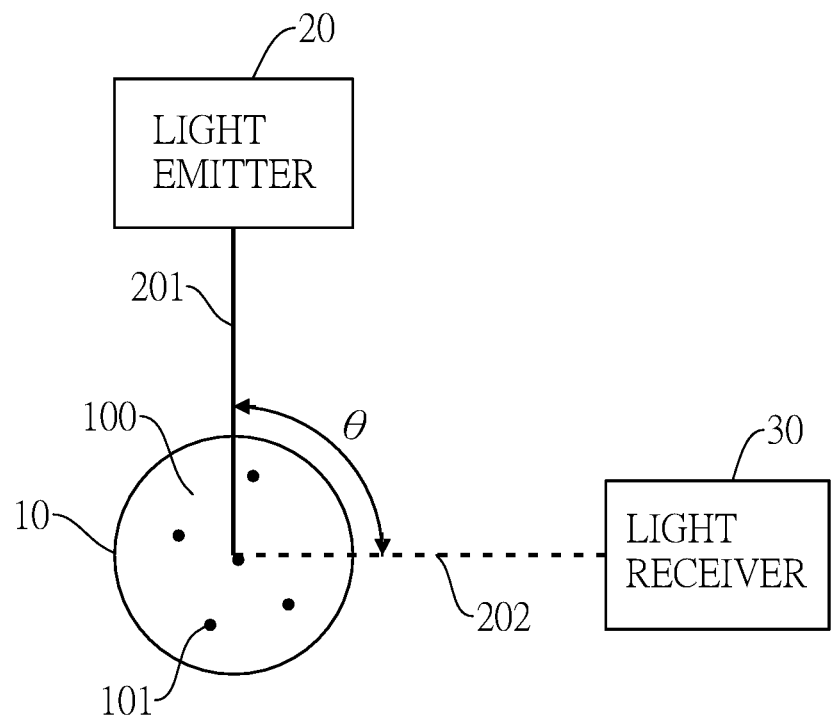
FIGS. 2A to 2B are schematic diagrams of the detection method of the particle detection device of the present invention.
Figure 2B:
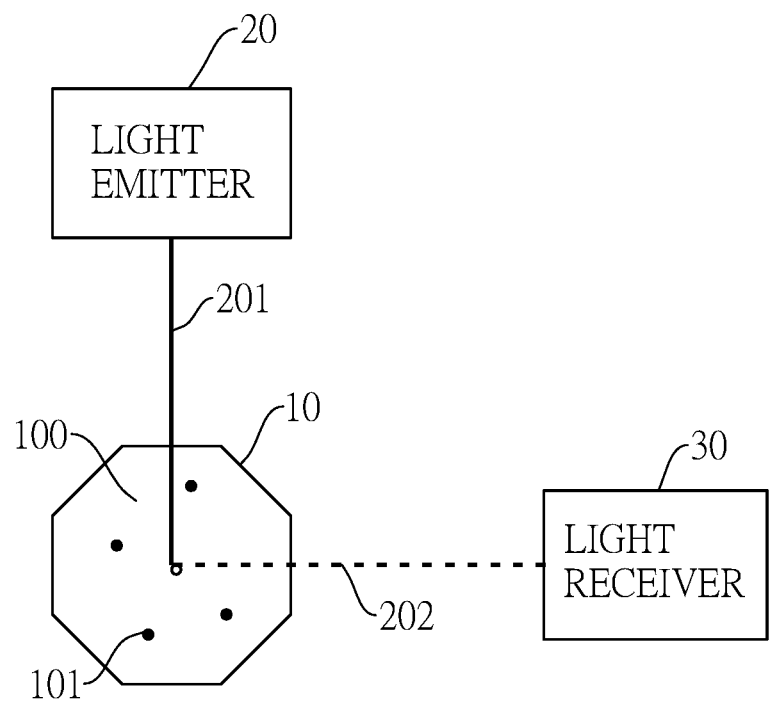

Further, referring to FIGS. 2B and 2C, an angle θ between the emission direction of the light emitter 20 emitting the detection light 201 and the receiving direction of the light receiver 30 receiving the detection light 202 is between 60 degrees and 120 degrees. The detection tube 10 is a transparent round tube or a transparent octagonal tube. The light emitter 20 is a laser diode with a wavelength between 250 and 808 nm. The light receiver 30 is a photosensitive diode, a spectrometer, a photosensitive coupling element sensor (CCD sensor), a complementary metal oxide semiconductor sensor (CMOS sensor) or a photomultiplier (PMT).

In addition, the particle detection device further includes a micro pump 102, which is arranged at the entrance of the detection tube and is electrically connected to the processing unit 40. The micro pump 102 is controlled by the processing unit 40 to push the detection solution 100 to flow in the detection tube 10. In this embodiment, the micro pump 102 pushes the detection solution 100 to flow in the detection tube 10 at a rate of 30 ml/min.

Figure 3A:
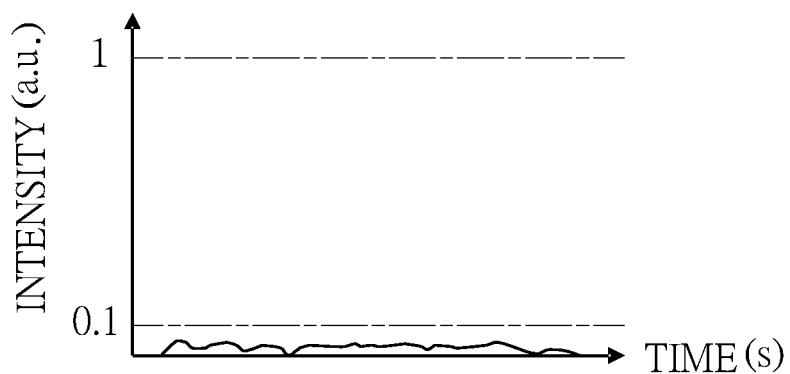
FIG. 3A is a waveform diagram of the detection signal when there are no particles in the detection solution.

For example, as shown in FIG. 3A, the first threshold value is set to 0.1 (a.u.). In this embodiment, the unit of the intensity value of the light source can be any unit (a.u.). For example, the unit of the light intensity value is candelas (cd), or other units that can represent light intensity, but not limited to this. When the intensity value of the receiving light is not greater than the first threshold value, it means that there is no particle 101 in the detection solution 100. Therefore, the processing unit 40 generates the detection result that the detection solution contains no particles.

Figure 3B:
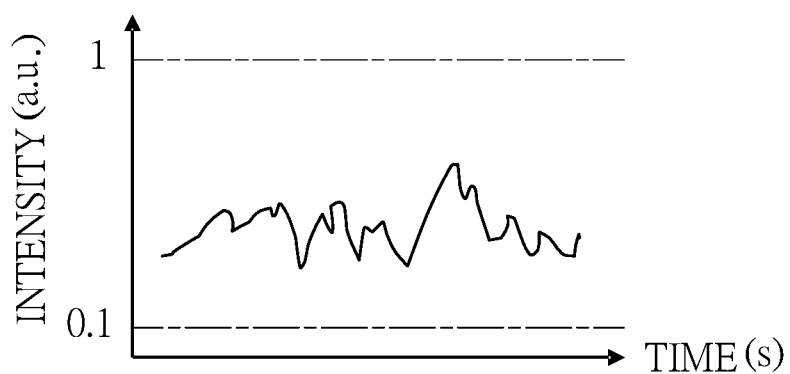
FIG. 3B is a waveform diagram of the detection signal when there are larger particles in the detection solution.
Figure 3C:
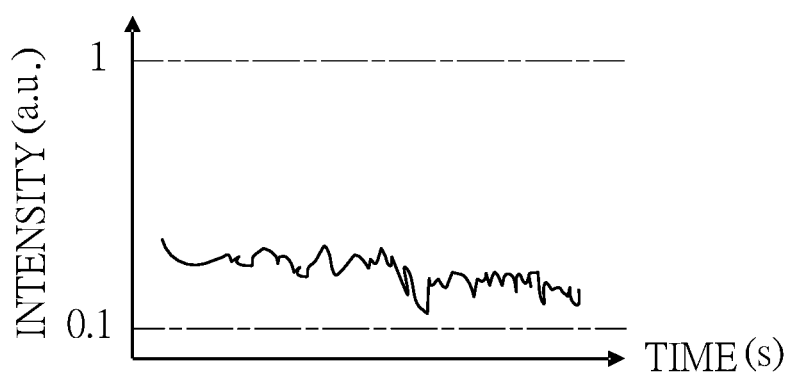
FIG. 3C is a waveform diagram of the detection signal when there are smaller particles in the detection solution.

Referring to FIG. 3B, when the received light intensity value is greater than the first threshold value, it means that there are particles 101 in the detection solution 100. Therefore, the processing unit 40 generates the detection result of particles in the detection solution. Furthermore, when the received light intensity value is greater than the first threshold value, the processing unit 40 can further determine the time difference between the peak and the trough. When the time difference is larger, as shown in FIG. 3B, it means that the particles 101 in the detection solution 100 are relatively large. When the time difference between the peak and the trough is smaller, as shown in FIG. 3C, it means that the particles 101 in the detection solution 100 are relatively small.

It means that the present invention not only determines whether there are particles 101 in the detection solution 100 by the light intensity value, but also further determines the size of the particles 101 in the detection solution 100 by the waveform diagram of light intensity value and time, which can provide more accurate detection results.

Figure 4:
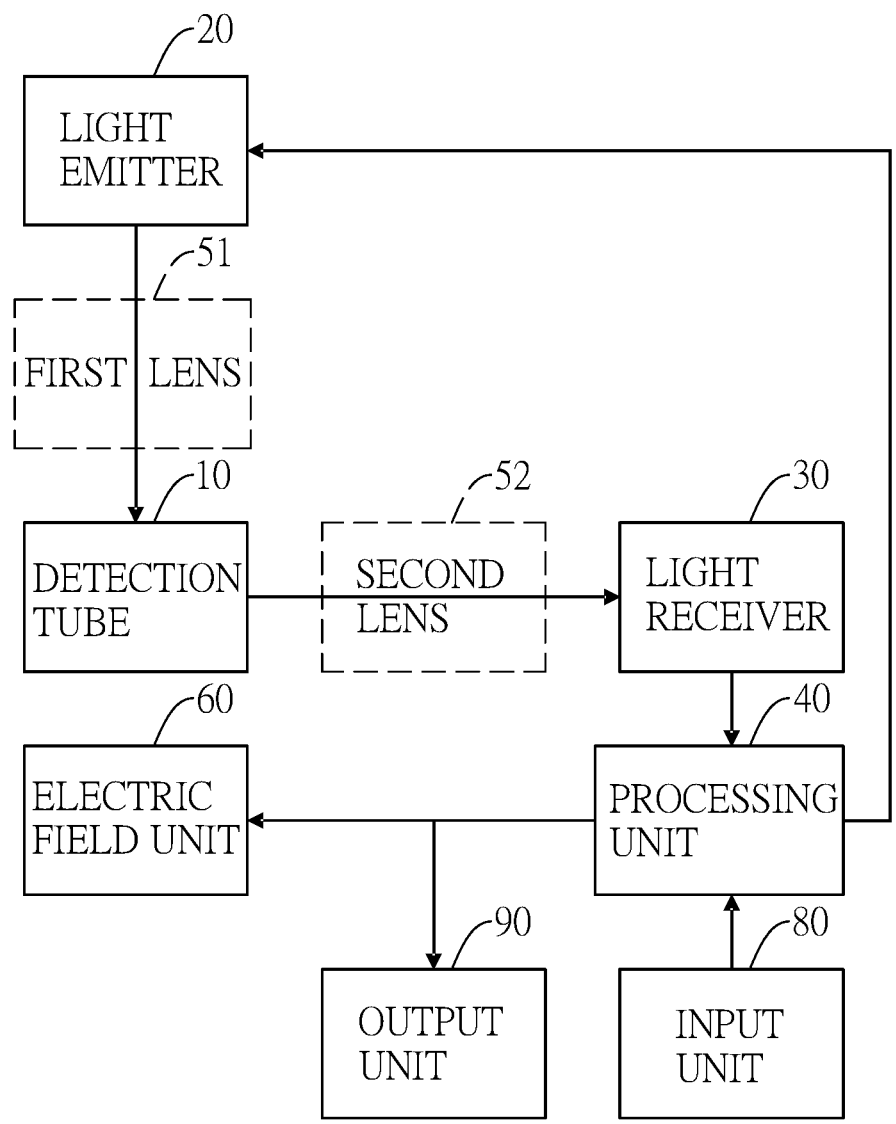
FIG. 4 is another block diagram of the particle detection device of the present invention.

In addition, referring to FIG. 4, the particle detection device further includes a first lens 51 and a second lens 52. The first lens 51 is disposed between the light emitter 20 and the detection tube 10. The detection light 201 emitted by the light emitter 20 goes into the detection solution 100 in the detection tube 10 through the first lens 51. The second lens 52 is disposed between the detection tube 10 and the light receiver 30, and the detection light 202 scattered from the detection solution 100 is emitted to the light receiver 30 through the second lens 52. In this embodiment, the first lens 51 and the second lens 52 are each a condensing lens, such as a convex lens, but not limited to this.

By providing the first lens 51 and the second lens 52, the detection light 201, 202 can be concentrated to increase the amount of light for detection.

Figure 5A:
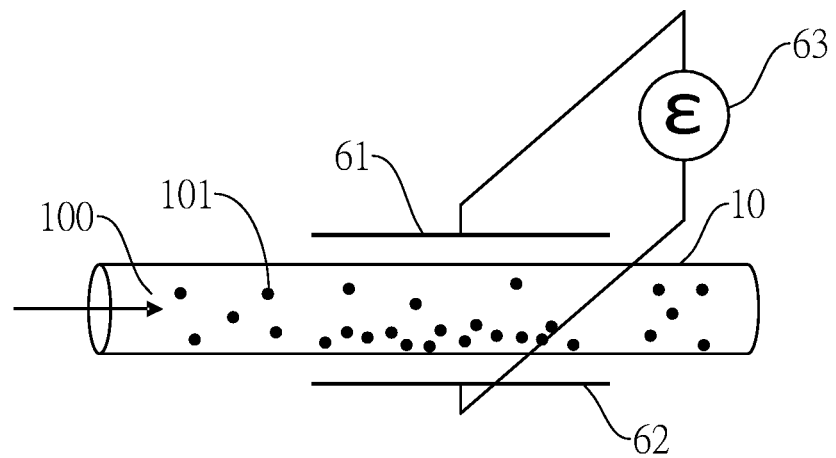
FIGS. 5A to 5C are schematic diagrams of another detection method of the particle detection device of the present invention.
Figure 5B:
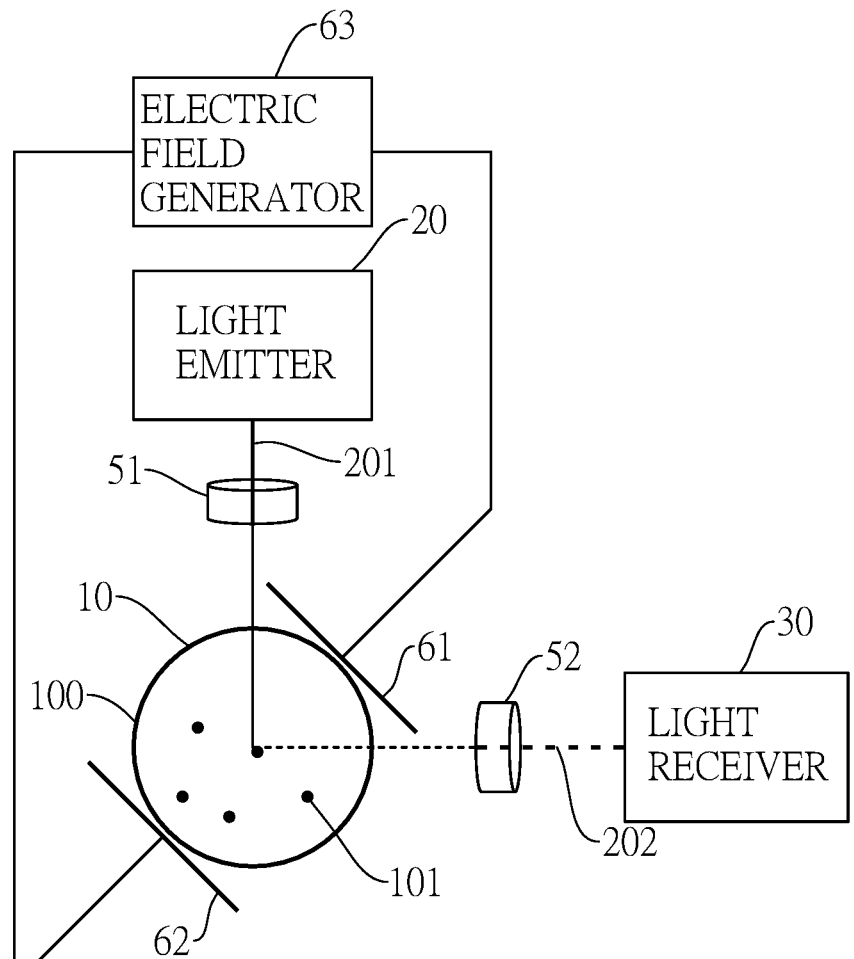
Figure 5C:
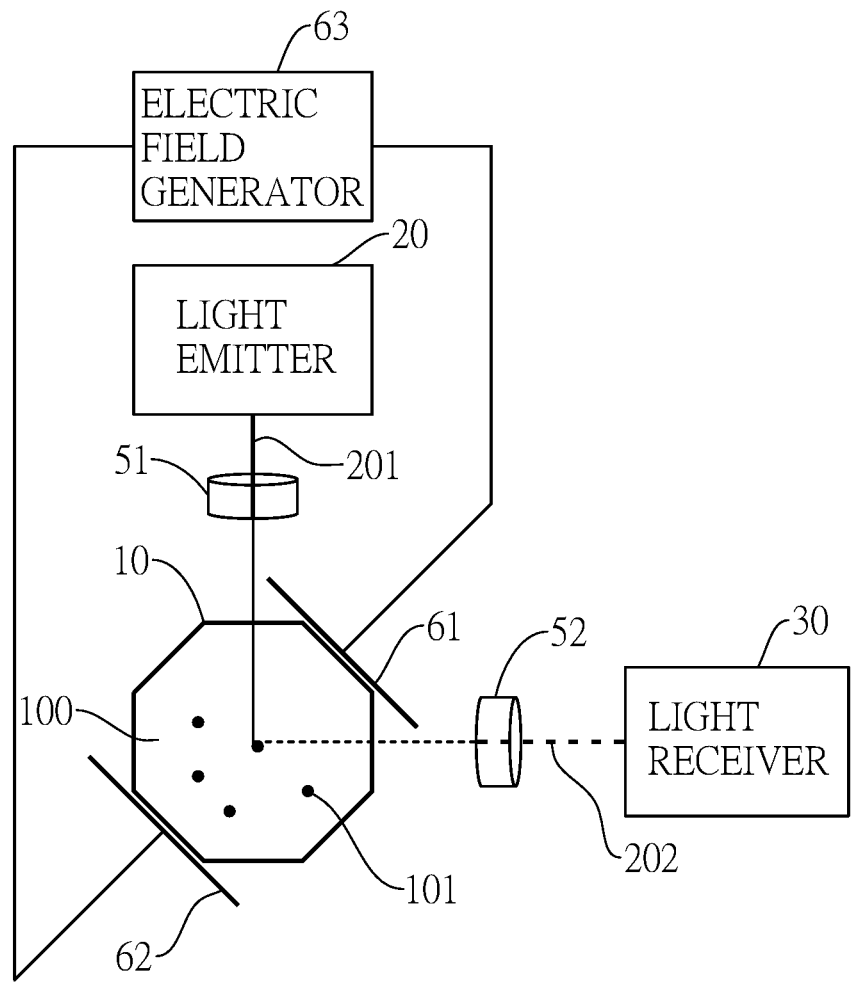

Furthermore, the particles 101 in the detection solution 100 are randomly distributed, for example, subjected to Brownian motion. The particle detection device of the present invention further includes an electric field unit 60 to concentrate the particles. Referring to FIGS. 5A to 5C, the electric field unit 60 includes a first electric field plate 61, a second electric field plate 62, and an electric field generator 63. The first electric field plate 61 is arranged on an outside of a wall of the detection tube 10. The second electric field plate 62 is also arranged on the outside of the wall of the detection tube 10. The first electric field plate 61 and the second electric field plate 62 are respectively arranged on opposite sides of the detection tube 10. The electric field generator 63 is electrically connected to the first electric field plate 61 and the second electric field plate 62, forming an electric field between the first electric field plate 61 and the second electric field plate 62. The electric field acts on the detection solution 100 in the detection tube 10. In this embodiment, the detection tube 10 is a transparent round tube or a transparent octagonal tube.

Since the electric field acts on the detection solution 100 in the detection tube 10, the particles 101 charged in the detection solution 100 can be concentrated near the first electric field plate 61 or the second electric field plate 62 by the electric field. The concentrated particles 101 can scatter more detection light 202 to be easily received by the light receiver 30.

Figure 6A:
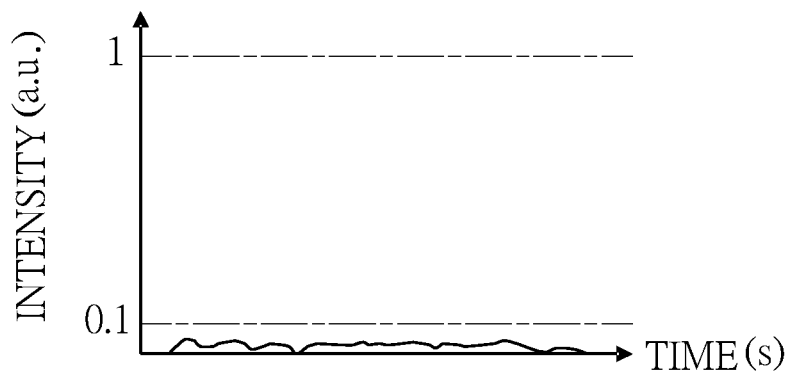
FIG. 6A is a waveform diagram of the detection signals before and after the electric field is applied to the detection solution without particles.

For example, as shown in FIG. 6A, when the received light intensity value is not greater than the first threshold value, it means that there are no particles 101 in the detection solution 100. Therefore, the processing unit 40 generates the detection result that the detection solution 100 contains no particles.

Figure 6B:
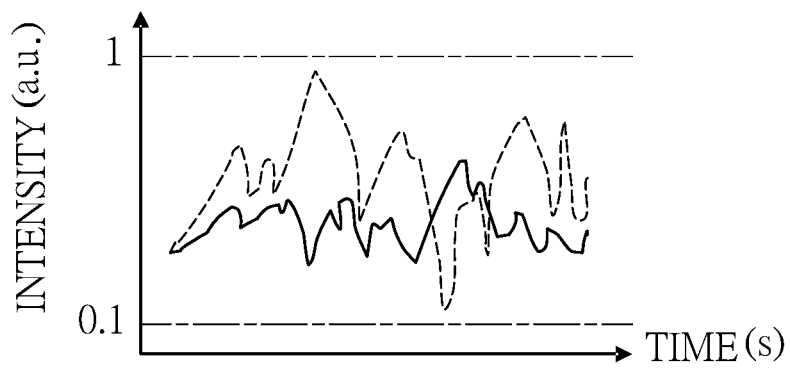
FIG. 6B is a waveform diagram of the detection signals before and after the electric field is applied to the detection solution with larger particles.

Referring to FIG. 6B, the received light intensity value greater than the first threshold value means that there are particles 101 in the detection solution 100. In addition, as the particles 101 are concentrated by the electric field, the received light intensity value of the received detection light 202 can be increased. For example, in FIG. 6B, the solid line represents the detection signal before the electric field is applied. The dotted line represents the detection signal after the electric field is applied. It can be seen from the figure that the amplitude of the detection signal becomes larger after the electric field is applied, which means that the particles are charged particles.

Further, the processing unit 40 also determines whether the time difference between the peak and the trough of the detection signal is greater than a second threshold value. The detection signal includes multiple intensity values within a detection time, and the received light intensity value is a minimum value (the trough) among the intensity values of the detection signal. When the processing unit 40 determines that the received light intensity value is greater than the first threshold value, it means that all the intensity values in the detection signal are greater than the first threshold value, and the detection solution 100 contains the particles 101. The processing unit 40 further determines whether the difference between a maximum value and the minimum value of the intensity values in the detection signal is greater than the second threshold value:

when the difference is greater than the second threshold value, it means that the particles 101 are concentrated by the electric field. Therefore, the processing unit 40 generates a detection result that the detection solution 100 contains charged particles.

when the difference is not greater than the second threshold value, it means that the particles 101 are not concentrated by the electric field. Therefore, the processing unit 40 generates a detection result that the detection solution 100 contains uncharged particles.

Figure 6C:
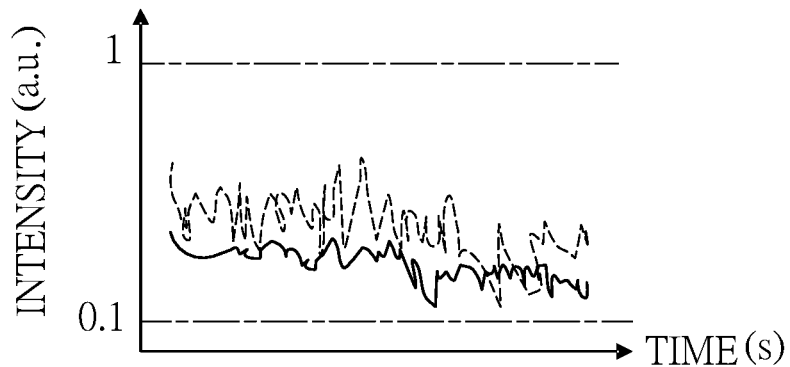
FIG. 6C is a waveform diagram of the detection signals before and after the electric field is applied to the detection solution with smaller particles.

Furthermore, when the received light intensity value is greater than the first threshold value, regardless of whether the difference is greater than the second threshold value, the processing unit 40 determines whether the time difference between the wave peak and the wave trough is greater than a third threshold value. When the time difference is greater than the third threshold value, it means that the particles 101 in the detection solution 100 are larger, as shown in FIG. 6B. When the time difference is not greater than the third threshold value, it means that the particles 101 in the detection solution 100 are smaller, as shown in FIG. 6C.

Figure 7:
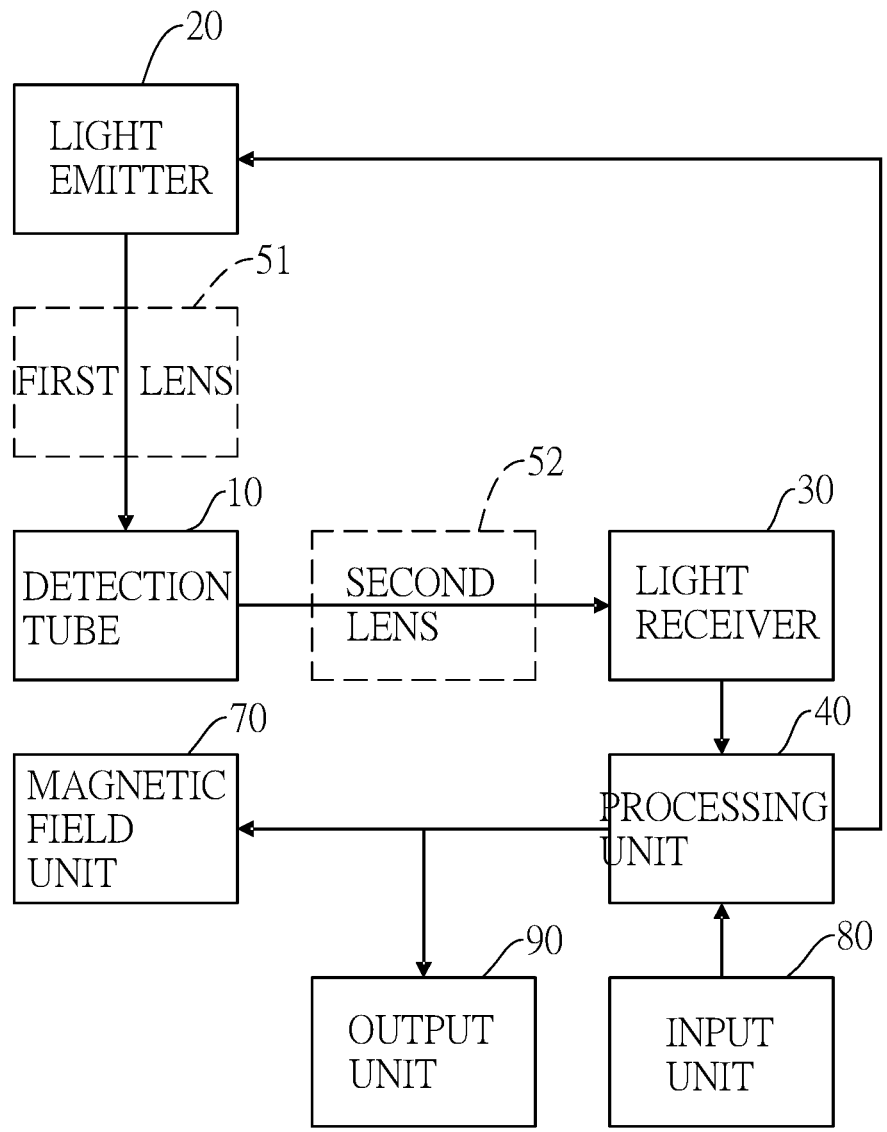
FIG. 7 is another block diagram of the particle detection device of the present invention.
Figure 8A:
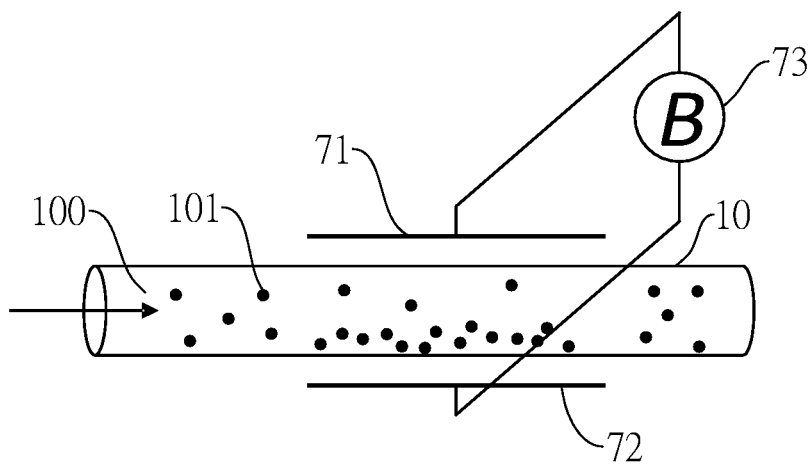
FIGS. 8A to 8C are schematic diagrams of another detection method of the particle detection device of the present invention.
Figure 8B:
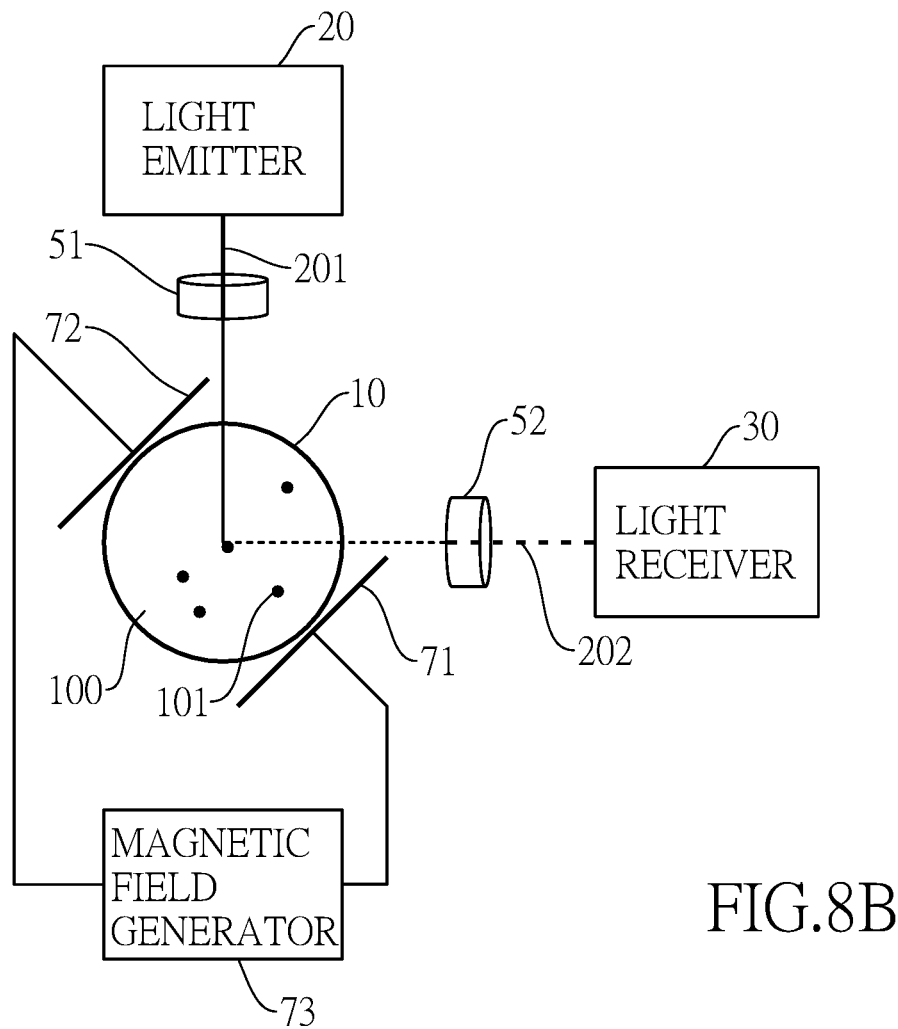
Figure 8C:
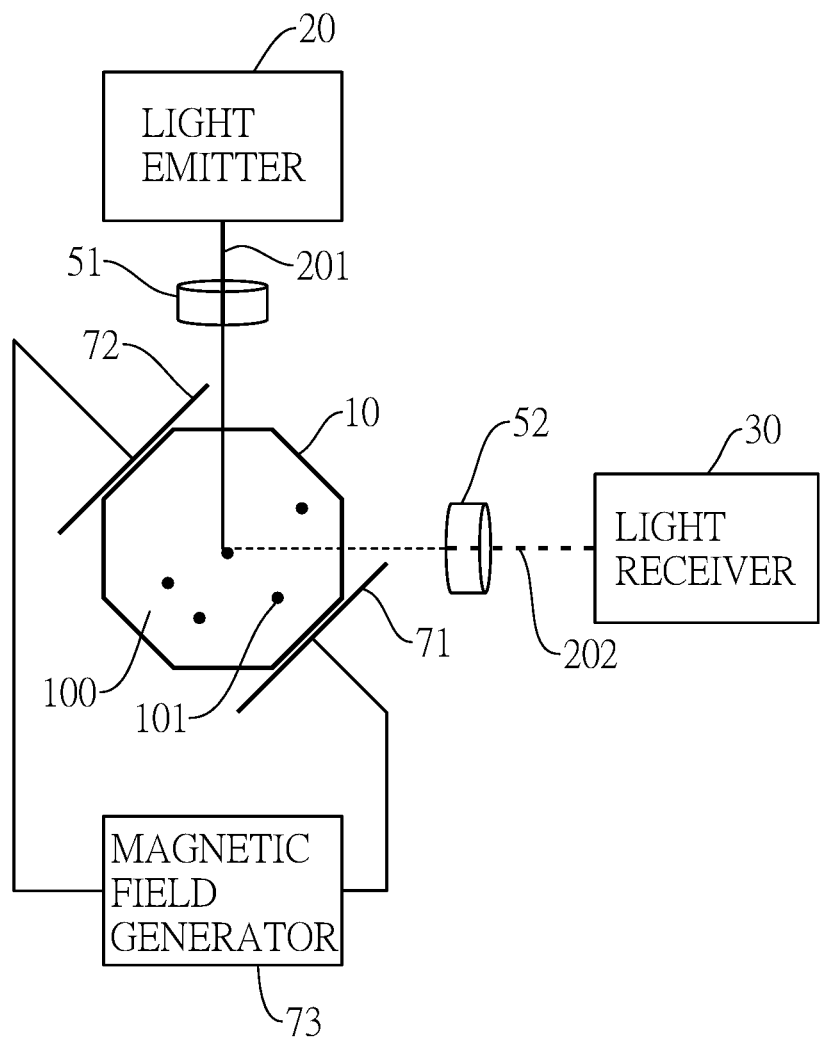

Additionally, referring to FIG. 7, the particle detection device of the present invention further includes a magnetic field unit 70. Referring to FIGS. 8A to 8C, the electric field unit 70 includes a first magnetic field plate 71, a second magnetic field plate 72 and a magnetic field generator 73. The first magnetic field plate 71 is arranged on the outside of a wall of the detection tube 10. The second magnetic field plate 72 is also arranged on the outside of the wall of the detection tube 10. Wherein the first magnetic field plate 71 and the second magnetic field plate 72 are respectively arranged on opposite sides of the detection tube 10. The magnetic field generator 73 is electrically connected to the first magnetic field plate 71 and the second magnetic field plate 72, forming a magnetic field between the first magnetic field plate 71 and the second magnetic field plate 72. The magnetic field acts on the detection tube 10 of the detection solution 100. In this embodiment, the detection tube 10 is a transparent round tube or a transparent octagonal tube.

Since the magnetic field acts on the detection solution 100 in the detection tube 10, when the particles 101 in the detection solution 100 are charged, they can be close to the first magnetic field plate 61 or the second magnetic field plate 62 by the magnetic field. The particles 101 can be more concentrated and the concentrated particles 101 can scatter more detection light 202 to be received by the light receiver 30.

Figure 9A:
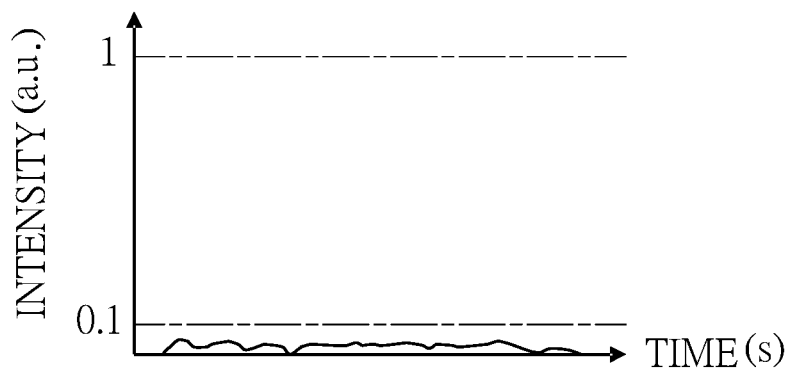
FIG. 9A is a waveform diagram of the detection signals before and after the magnetic field is applied to the detection solution without particles.

For example, as shown in FIG. 9A, when the received light intensity value is not greater than the first threshold value, it means that there are no particles 101 in the detection solution 100. Therefore, the processing unit 40 generates the detection result that the detection solution contains no particles.

Figure 9B:
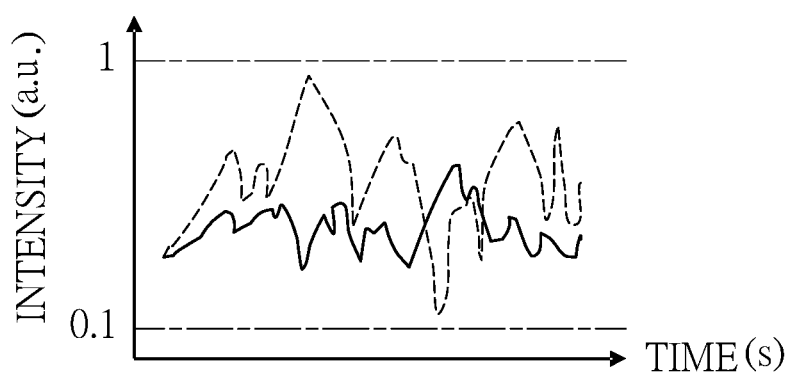
FIG. 9B is a waveform diagram of the detection signals before and after the magnetic field is applied to the detection solution with larger metal particles.

Referring to FIG. 9B, when the received light intensity value is greater than the first threshold value, it means that there are particles 101 in the detection solution 100. In addition, as the particles 101 are concentrated by the magnetic field, the received light intensity value of the received detection light 202 can be increased. For example, in FIG. 9B, the solid line represents the detection signal before the magnetic field is applied. The dotted line represents the detection signal after the magnetic field is applied. It can be seen from the figure that the amplitude of the detection signal becomes larger after the magnetic field is applied, which means that the particles are metal particles.

Similarly, the processing unit 40 also determines whether the time difference between the peak and the trough of the detection signal is greater than the second threshold value. The detection signal includes multiple intensity values within a detection time, and the received light intensity value is a minimum value (the trough) among the intensity values of the detection signal. When the processing unit 40 determines that the received light intensity value is greater than the first threshold value, it means that all the intensity values in the detection signal are greater than the first threshold value, and the detection solution 100 contains the particles 101. The processing unit 40 further determines whether the difference between a maximum value and the minimum value of the intensity values in the detection signal is greater than the second threshold value:

when the difference is greater than the second threshold value, it means that the particles 101 are concentrated by the magnetic field. Therefore, the processing unit 40 generates a detection result that the detection solution 100 contains metal particles;

when the difference is not greater than the second threshold value, it means that the particles 101 are not concentrated by the magnetic field. Therefore, the processing unit 40 generates a detection result that the detection solution 100 contains no metal particles.

Figure 9C:
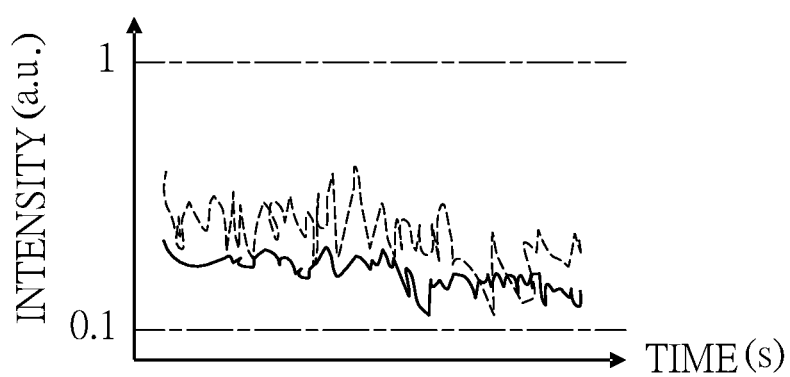
FIG. 9C is a waveform diagram of the detection signals before and after the magnetic field is applied to the detection solution with smaller metal particles.

Furthermore, when the received light intensity value is greater than the first threshold value, regardless whether the difference is greater than the second threshold value, the processing unit 40 determines whether the time difference between the wave peak and the wave trough is greater than a third threshold value. When the time difference is greater than the third threshold value, it means that the particles 101 in the detection solution 100 are larger, as shown in FIG. 9B. When the time difference is not greater than the third threshold value, it means that the particles 101 in the detection solution 100 are smaller, as shown in FIG. 9C.

Referring to FIG. 7, the particle detection device further includes an input unit 80 and an output unit 90. The input unit 80 is electrically connected to the processing unit 40, generates the activation signal, and outputs the activation signal to the processing unit 40. The output unit 90 is electrically connected to the processing unit 40, and receives and outputs the detection results, such as, the detection result that the detection solution contains particles or no particles. In this embodiment, the input unit 70 can be a button or a touch display. The output unit 80 can be an LED indicator, a touch display, or a buzzer.

In summary, the particle detection device of the present invention not only detects the particles 101 in the detection solution 100, but also detects whether the particles are charged particles or metal particles based on the detection signal. The determination of the particles of the particles 101 provides a basis for semiconductor manufacturing companies to evaluate whether the chemical solution can be used for high-precision manufacturing processes. Therefore, the manufacturing process can be optimized and the yield of the high-precision manufacturing process can be improved.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A particle detection device comprising:
    a detection tube, for passing through a detection solution;
    a light emitter, generating a detection light, and emitting the detection light to the detection solution;
    a light receiver, receiving the detection light scattered from the detection solution, and generating a detection signal according to the detection light; and
    a processing unit, electrically connected to the light emitter and the light receiver;
    wherein, when the processing unit receives an activation signal, the processing unit controls the light emitter to generate the detection light, and emits the detection light to the detection tube;
    wherein, when the processing unit receives the detection signal generated by the light receiver, the processing unit generates a received light intensity value according to the detection signal and determines whether the received light intensity value is greater than a first threshold value;
    when the received light intensity value is greater than the first threshold value, the processing unit generates a detection result that the detection solution contains particles; and
    when the received light intensity value is not greater than the first threshold value, the processing unit generates a detection result that the detection solution contains no particles.

2. The particle detection device of claim 1, wherein an angle between an emission direction of the detection light emitted by the light emitter and a receiving direction of the detection light received by the light receiver is between 60 degrees and 120 degrees.

3. The particle detection device of claim 1, wherein the detection tube is a transparent round tube or a transparent octagonal tube.

4. The particle detection device of claim 1, further comprising:
    a first lens, arranged between the light emitter and the detection tube, wherein the detection light emitted by the light emitter enters the detection solution in the detection tube through the first lens; and
    a second lens, arranged between the detection tube and the light receiver, wherein the detection light scattered from the detection solution is directed to the light source receiver through the second lens.

5. The particle detection device of claim 1, further comprising:
    an electric field unit having:
        a first electric field plate, arranged on an outside of a wall of the detection tube;

a second electric field plate, arranged on the outside of the wall of the detection tube;
wherein the first electric field plate and the second electric field plate are arranged on opposite sides of the wall of the detection tube;
an electric field generator, electrically connected to the first electric field plate and the second electric field plate and forming an electric field between the first electric field plate and the second electric field plate;
wherein the electric field is applied to the detection solution in the detection tube.

6. The particle detection device of claim 5, wherein the detection signal includes multiple intensity values within a detection time, and the received light intensity value is a minimum value among the intensity values in the detection signal;
wherein, when the processing unit determines that the received light intensity value is greater than the first threshold value, the processing unit further determines whether the difference between a maximum value and a minimum value of the intensity values in the detection signal is greater than a second threshold value;
when the difference is greater than the second threshold value, the processing unit generates a detection result that the detection solution contains charged particles;
when the difference is not greater than the second threshold value, the processing unit generates a detection result that the detection solution contains uncharged particles.

7. The particle detection device of claim 1, further comprising:
a magnetic field unit having:
a first magnetic field plate, arranged on an outside of a wall of the detection tube;
a second magnetic field plate arranged on the outside of the wall of the detection tube; wherein the first magnetic field plate and the second magnetic field plate are arranged on opposite sides of the wall of the detection tube;
a magnetic field generator, electrically connected to the first magnetic field plate and the second magnetic field plate and forming a magnetic field between the first magnetic field plate and the second magnetic field plate, wherein the magnetic field is applied to the detection solution in the detection tube.

8. The particle detection device of claim 7, wherein the detection signal includes multiple intensity values within a detection time, and the received light intensity value is a minimum value among the intensity values in the detection signal;
wherein, when the processing unit determines that the received light intensity value is greater than the first threshold value, the processing unit further determines whether the difference between a maximum value and a minimum value of the intensity values in the detection signal is greater than a second threshold value:
when the difference is greater than the second threshold value, the processing unit generates a detection result that the detection solution contains metal particles;
when the difference is not greater than the second threshold value, the processing unit generates a detection result that the detection solution contains non-metallic particles.

9. The particle detection device of claim 1, further comprising:
an input unit, electrically connected to the processing unit, generating the activation signal, and outputting the activation signal to the processing unit.

10. The particle detection device of claim 1, further comprising:
an output unit, electrically connected to the processing unit, receiving the detection result that the detection solution contains particles or no particles, and outputting the detection result.

* * * * *